United States Patent Office 2,745,813
Patented May 15, 1956

2,745,813

METHOD OF AND MATERIAL FOR TAKING IMPRESSIONS, ESPECIALLY FOR DENTAL PURPOSES

Heino Logemann, Leverkusen, and Wilhelm Graulich and Wilhelm Becker, Leverkusen-Bayerwerk, Germany, assignors to Farbenfabriken Bayer Aktiengesellschaft, Leverkusen, Germany, a corporation of Germany No Drawing. Application November 9, 1950,
Serial No. 194,926

Claims priority, application Switzerland
November 16, 1949

8 Claims. (Cl. 260—29.6)

The present invention relates to a new method of and a new material for taking impressions, especially for dental purposes.

The new method comprises the use of polymerizable compounds containing one polymerizable double bond and, particularly, of such forming gels in their polymerized state with solvents. Impressions are taken according to the present invention by way of pasty mixtures of polymerizable compounds containing one polymerizable double bond with appropriate solvents. After adding a polymerization catalyst, however, and before attaining the final state of polymerization, said mixtures are brought into contact with the object of which an impression is to be taken until polymerization is complete. The pasty condition required may be achieved in various manners. The most simple manner consists in making the solution of the compounds containing one polymerizable double bond in a suitable solvent into a paste by means of solid fillers. However, it is also feasible to add to the solution substances increasing its viscosity. A further modification consists in causing the polymerization catalyst to act before applying the mixture to such a degree that the desired pasty condition is attained by the initial polymerization. The aforesaid additions may also find application in combination.

As solvents for dental impression materials especially water or strongly hydrophilic organic solvents, such as glycerin or aqueous solutions of glycerin may find application. Suitable polymerizable compounds containing one polymerizable double bond forming gels in their polymerized state in water, glycerin and the like are acrylic acid, fumaric or maleic acid and their salts as well as amides and hydroxyalkyl esters of the said acids. As polymerization catalysts there are preferably used catalysts which guarantee completion of the polymerization within a short time. The activation and reaction conditions for dental purposes are to be so applied that the polymerization temperature does not exceed 45° C. Such catalysts are available, for instance, in the so-called "Redox-systems," i. e. mixtures of oxidizing + reducing agents. The reaction velocity may be promoted by the application of ultraviolet rays. Suitable mineral fillers are various inorganic pigments, calcium sulfate ($CaSO_4$, $CaSO_4.\frac{1}{2}H_2O$, $CaSO_4.2H_2O$), titanium dioxide, aluminium oxide, bentonite, talcum and the like. Fillers increasing the viscosity are silica gels, especially those capable of swelling in water. As further substances for increasing the viscosity there may be mentioned carbohydrates, such as agar-agar and dextrine, furthermore cellulose derivatives soluble in the solvent applied, for instance methyl cellulose, salts of the alginic acid, polyacrylic acid, as well as polymerizates of the polymerizable compounds containing one polymerizable double bond used according to the invention. Furthermore, the impression masses may contain the customary additions of dyestuffs, disinfecting agents, flavoring materials, fibers etc.

A special embodiment of the invention consists in utilizing polyfunctional products as polymerizable compounds containing one polymerizable double bond, that is to say organic compounds containing more than one compound containing one polymerizable double bond. These products may be employed alone or in combination with monofunctional compounds containing one polymerizable double bond. Suitable polyfunctional compounds containing one polymerizable double bond are, for instance, polyamides of acrylic acid or methacrylic acid, and organic compounds containing at least two amino groups, such as ethylene diamine or hexamethylene diamine, furthermore hexahydro-1,3,5-triacrylyl-s-triazine, i. e. the reaction product of acrylonitrile and anhydrous formaldehyde (cf. Chemische Berichte, vol. 81 (1948), p. 527). These polyfunctional compounds containing one polymerizable double bond promote gel-formation and improve the elastic properties of the polymerized material. They are preferably employed in admixture with the above-mentioned monofunctional compounds containing one polymerizable double bond.

The present invention may be accomplished in most various ways, and many modifications and changes may be made owing to the plurality of compounds containing one polymerizable double bond and fillers which may find application according to the invention. Therefore, the invention may be accomplished by way of the most various combinations which can be adapted to any practical requirements.

The invention is further illustrated by the following examples without being restricted thereto, the parts mentioned being by weight.

Example 1

5 parts of a 16.5 per cent aqueous solution of monomeric acrylamide are thoroughly stirred with 3 parts of a 10 per cent polyacrylic acid solution, 2 parts of gypsum, 0.5 part of a 10 per cent solution of ethylene diacrylamide and 1.5 parts of magnesium oxide. By adding to the paste thus obtained 0.1 part of potassium persulfate and 0.2 part of triethanolamine in some water with intimately stirring polymerization is initiated after a short period with a slight increase of temperature. The compounded mass thus obtained can be placed on an impression tray for application to the mouth before polymerization is complete and before the material has set. Gelation is complete within a few minutes.

Example 2

4 parts of calcium carbonate and 3 parts of magnesium carbonate are made into a stable paste with 10 parts of a 16.5 per cent acrylamide solution, 6 parts of a 10 per cent polyacrylic acid solution, 1 part of a 10 per cent ethylene diacrylamide solution and 0.8 part of a 10 per cent triethanolamine solution. Gelation is brought about by polymerization with 0.2 part of potassium persulfate.

Example 3

10 parts of talcum, 10 parts of a 16.5 per cent acrylamide solution, 0.3 part of magnesium carbonate, 0.1 part of N.N'.N''-triacryloyltrimethylenetriamine, 2 parts of a 10 per cent polyacrylic acid solution are made into a paste with stirring with the stepwise addition of 4 parts of water. For initiating polymerization 0.5 part of potassium persulfate and 0.3 part of formamidine sulfinic acid are added.

Example 4

10 parts of talcum, 10 parts of a 16.5 per cent acrylamide solution, 0.13 part of magnesia, 0.2 part of N.N'.N''-triacryloyltrimethylenetriamine, 0.5 part of gelatin and 2 part of a 10 per cent polyacrylic acid solution are made into a stable paste with the addition of 4 parts of water. Gelation of the paste by means of polymerization is initiated by adding 0.3 part of potassium persulfate and 0.2 part of formamidine sulfinic acid.

*Example 5*

15 parts of talcum and 2 parts of silica gel are ground together with 0.05 part of N.N'.N''-triacryloyltrimethylenetriamine, 4 parts of acrylamide and 25 parts of a 1.5 per cent agar solution. 0.1 part of triethanolamine and 0.2 part of potassium persulfate are used as polymerization catalysts.

*Example 6*

20 parts of talcum are made into a stable paste with 20 parts of 75 per cent glycerin, 4 parts of acrylamide, 0.5 part of N.N'.N''-triacryloyltrimethylenetriamine and 0.15 part of triethanolamine. Gelation of the paste is initiated by adding 0.5 part of potassium persulfate.

*Example 7*

A mixture of 20 parts of gypsum, 20 parts of talcum, 5 parts of acrylamide and 0.7 part of formamidine sulfinic acid can be hardened after stirring with 25 parts of water by adding 0.7 part of potassium persulfate within 5 minutes, whereas the addition of gypsum, talcum and water alone results in a brittle mass.

*Example 8*

20 parts of talcum, 5 parts of 69 per cent acrylic acid, 0.07 part of N.N'.N''-triacryloyltrimethylenetriamine, 3.5 parts of silica gel and 0.5 part of formamidine sulfinic acid are made into a paste with 20 parts of water with stirring. After adding 0.5 part of potassium persulfate the paste polymerizes on the impression mold within a few minutes to form an elastic accurately shaped impression.

*Example 9*

A mixture of 3.8 parts of acrylamide, 8 parts of zinc oxide, 6 parts of talcum, 15 parts of highly active, finely distributed silica gel, 2.5 parts of sugar, 0.7 parts of calcium oxide, 0.15 part of N.N'.N''-triacryloyltrimethylenetriamine, 0.2 part of filaments of high-polymeric, linear polyamides or other linear high polymers (thin individual filaments cut to about 0.2 cm. length or twisted cotton threads of the same length) and 0.5 part of triethanolamine hydrochloride is stirred with 55 cc. of water of 18–22° C. until a homogenic paste has been formed. Thereupon 0.25 part of potassium persulfate is added to the paste which is thoroughly mixed and kneaded with a spatula, placed on the impression tray and applied to the mouth within ½ to 1½ minutes after the addition of persulfate. The compounded material sets with slightly heating (to 38° C.). The impression is taken from the mouth after 2–3 minutes by means of a slight pressure and subsequently cast with gypsum.

*Example 10*

5 parts of acrylamide and 0.15 part of N.N'.N''-triacryloyltrimethylenetriamine are mixed with 20 parts of silica gel, 0.5 part of zinc oxide, 3 parts of sugar and 1.2 parts of triethanolamine. On kneading the mixture with 50 parts of water a paste is obtained which polymerizes with 0.25 part of potassium persulfate within a few minutes to an elastic gel.

*Example 11*

4 parts of acrylamide and 0.3 part of N.N'.N''-triacryloyltrimethylenetriamine are stirred with 16 parts of silica gel, 8 parts of zinc oxide, 2 parts of triethanolamine, 20 parts of sugar, 15 parts of glycerin and 15 parts of water to a stable paste. Gelation of the paste is initiated by adding 1 part of potassium persulfate. The paste is applied to the object of which an impression is to be taken before a gel has formed, so that gel-formation takes place in contact with said object. The impression material is easily removed from the object when gel-formation is complete.

We claim:

1. A material for taking impressions for dental purposes as claimed in claim 5 in which the compound (a) is acrylamide, the compound (b) is hexahydro-1,3,5-triacrylyl-s-triazine and the solvent is water.

2. A material for taking impressions for dental purposes as claimed in claim 5 in which the compound (a) is acrylic acid, the compound (b) is hexahydro-1,3,5-triacrylyl-s-triazine and the solvent is water.

3. A material for taking impressions for dental purposes as claimed in claim 5 in which the compound (a) is acrylamide, the compound (b) is hexahydro-1,3,5-triacrylyl-s-triazine and the solvent is glycerin.

4. A material for taking impressions for dental purposes as claimed in claim 5 in which the compound (a) is acrylamide, the compound (b) is ethylene diacrylamide and the solvent is water.

5. A material for taking impressions for dental purposes comprising a mixture of a compound (a) selected from the group consisting of acrylamide and acrylic acid, and a compound (b) selected from the group consisting of alkylene diacrylamide, alkylene dimethacrylamide and hexahydro-1,3,5-triacrylyl-s-triazine, a solvent for the compounds (a) and (b) forming a gel with said compounds during the polymerization and a polymerization catalyst capable of effecting polymerization at temperatures not exceeding about 45° C.

6. A material for taking impressions for dental purposes comprising a mixture of a compound (a) selected from the group consisting of acrylamide and acrylic acid, and a compound (b) selected from the group consisting of alkylene diacrylamide, alkylene dimethacrylamide and hexahydro-1,3,5-triacrylyl-s-triazine, a solvent for the compounds (a) and (b) forming a gel with said compounds during the polymerization, a filler and a redox system as polymerization catalyst capable of effecting polymerization at temperatures not exceeding about 45° C.

7. A material for taking impressions for dental purposes comprising a mixture of (a) a major amount of a compound selected from the group consisting of acrylamide and acrylic acid, and (b) a minor amount of a compound selected from the group consisting of alkylene diacrylamide, alkylene dimethacrylamide and hexahydro-1,3,5-triacrylyl-s-triazine, a solvent for the compounds (a) and (b) forming a gel with said compounds during the polymerization, a filler and a redox system as polymerization catalyst capable of effecting polymerization at temperatures not exceeding about 45° C.

8. A process for taking impressions for dental purposes which comprises applying an impression material as claimed in claim 5 to the object of which the impression is to be taken before a gel has formed from said material.

References Cited in the file of this patent

UNITED STATES PATENTS

| | | |
|---|---|---|
| 2,310,731 | D'Alelio | Feb. 9, 1943 |
| 2,476,527 | Barnes et al. | July 19, 1949 |
| 2,581,402 | Fryling | Jan. 8, 1952 |

FOREIGN PATENTS

| | | |
|---|---|---|
| 467,402 | Great Britain | June 11, 1937 |

OTHER REFERENCES

Hackh's Chemical Dictionary (3rd ed.), Grant page 895, 1944, Blakiston Company.